(12) United States Patent
Ohinata et al.

(10) Patent No.: US 7,489,468 B2
(45) Date of Patent: Feb. 10, 2009

(54) METHOD AND APPARATUS FOR HEAD POSITIONING CONTROL IN A DISK DRIVE

(75) Inventors: Yusuke Ohinata, Tachikawa (JP); Koji Osafune, Ome (JP); Yuji Sakai, Ome (JP); Masahide Yatsu, Akishima (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 176 days.

(21) Appl. No.: 11/634,960

(22) Filed: Dec. 7, 2006

(65) Prior Publication Data

US 2007/0139811 A1  Jun. 21, 2007

(30) Foreign Application Priority Data

Dec. 21, 2005 (JP) ............................. 2005-368105

(51) Int. Cl.
*G11B 5/596* (2006.01)
(52) U.S. Cl. .................................. 360/77.04
(58) Field of Classification Search ......... None
See application file for complete search history.

(56) References Cited

U.S. PATENT DOCUMENTS

| | | | |
|---|---|---|---|
| 5,444,371 A | 8/1995 | Tomisaki et al. | |
| 5,615,191 A | 3/1997 | Takeda et al. | |
| 5,745,455 A | 4/1998 | Takeda et al. | |
| 5,761,165 A | 6/1998 | Takeda et al. | |
| 5,905,705 A | 5/1999 | Takeda et al. | |
| 5,923,491 A | 7/1999 | Kisaka et al. | |
| 6,236,527 B1 * | 5/2001 | Uchiike et al. | 360/75 |
| 6,650,491 B2 * | 11/2003 | Suzuki et al. | 360/77.02 |
| 6,687,078 B1 * | 2/2004 | Kim | 360/77.04 |
| 6,760,183 B2 * | 7/2004 | Kusumoto | 360/77.04 |
| 6,894,862 B2 * | 5/2005 | Kusumoto | 360/77.04 |
| 7,046,477 B2 * | 5/2006 | Shibata | 360/77.04 |
| 7,057,844 B2 * | 6/2006 | Sakai et al. | 360/77.04 |
| 7,075,747 B2 * | 7/2006 | Takaishi | 360/77.04 |
| 7,193,808 B2 * | 3/2007 | Takaishi | 360/77.04 |
| 7,221,533 B2 * | 5/2007 | Iwashiro et al. | 360/77.04 |
| 7,333,287 B2 * | 2/2008 | Hara | 360/77.02 |
| 2006/0098330 A1 * | 5/2006 | Takaishi | 360/77.04 |

FOREIGN PATENT DOCUMENTS

| | | |
|---|---|---|
| JP | 02-282981 | 11/1990 |
| JP | 06-259904 | 9/1994 |
| JP | 06-275034 | 9/1994 |
| JP | 2005-216378 | 8/2005 |

* cited by examiner

*Primary Examiner*—Hoa T Nguyen
*Assistant Examiner*—James L Habermehl
(74) *Attorney, Agent, or Firm*—Pillsbury Winthrop Shaw Pittman, LLP (57) ABSTRACT

According to one embodiment, a disk drive is provided which corrects already existing offset information according to a variation of a disk runout amount caused by an occurrence of a disk shift. The disk drive effects a head position adjustment at a head positioning control time with the use of offset information stored in a memory. A CPU measures a variation in the disk runout amount and phase caused by an occurrence of a disk shift resulting from an external shock involved and updates the existing offset information with a correction offset information based on a result of measurement.

11 Claims, 4 Drawing Sheets

| Track number | Sector No. | Flag | Offset value | Correction offset value |
|---|---|---|---|---|
| Tn | Sn | F | OFn | OFCn |
| | Sn+1 | | OFn+1 | |
| | ⋮ | | ⋮ | |
| Tn+1 | | | | |

METHOD AND APPARATUS FOR HEAD POSITIONING CONTROL IN A DISK DRIVE

CROSS-REFERENCE TO RELATED APPLICATIONS

This application is based upon and claims the benefit of priority from Japanese Patent Application No. 2005-368105, filed Dec. 21, 2005, the entire contents of which are incorporated herein by reference.

BACKGROUND

1. Field

The present invention relates generally to a disk drive and, in particular, to a head positioning control technique.

2. Description of the Related Art

In general, in a hard disk drive, head positioning control is performed to position a magnetic head to a target position (a target track or a target cylinder) on a disk medium. The magnetic head has a structure such that a read head comprised of, for example, a GMR (a giant magnetoresistive element) or a TMR (a tunnel MR) and write head are mounted on the same slider as a separate unit. The read head is comprised of a read only head for reading recorded data from a disk medium. The write head is comprised of a head for writing data onto the disk medium.

In the disk drive, the magnetic head is usually mounted on a rotary type actuator and, by the driving of the actuator, moved to a target position on the disk medium. There, the read head and write head in the magnetic head are positioned in a different position. Upon the recording and reproduction of data, therefore, it is necessary to adjust the moving of the magnetic head so that the magnetic head is positioned on the same track on the disk medium. That is, it is necessary to position the write head on a target track upon the recording of data and to position the read head on the target track upon the reproduction of data.

The amount of movement involved upon the adjustment of this movement is called as an offset. The offset value is uniquely determined according to the distance between the read head and the write head and the radial position of the magnetic head over the disk medium. That is, the offset value is calculated from the distance between the read head and the write head and the skew angle (differing dependent upon the radial position) of the actuator.

Generally, at the time of manufacturing a disk drive, the offset value is measured or calculated in track units and stored as a fixed value in a memory (a flash EEPROM, etc.) in the disk drive. A microprocessor (CPU) in the drive reads out the offset value from the memory at the time of performing head positioning and uses this value to adjust the head under the head position control. Or, the CPU performs an approximate calculation from the offset value on a plurality of reference measuring tracks and calculates an offset value of a corresponding track.

As a method of the manufacture of the disk drive, a disk medium with servo data recorded thereon by a dedicated servo track writer is incorporated in the disk drive. In such a disk drive, a so-called disk runout is generated in the incorporating process. The disk runout is synchronized with the rotation of a spindle motor which rotates the disk medium.

If there is any disk runout, the physical radial position of the magnetic head varies even on the same track during one rotation of the disk medium and there is also a variation in the offset involved. If, in the disk drive involving a disk runout, any head positioning control is made with the use of a fixed value, which is an offset value in the track unit, there exists a positioning portion at a position displaced toward the inner or outer circumference side of the track on the magnetic head during one rotation of the track on the magnetic head.

In a disk drive, generally, the track over which recording is performed by the write head is made wider than the track over which reproduction is performed by the read head. For this reason, even if some positional displacement of the read head occurs, no lowering of the quality of the reproduction signal occurs at a data read mode. In recent years, the difference between the recording track width and the reproduction track width is made smaller due to an increased tendency toward a higher recording density of the disk drive, so that an allowable positional variation in one circumference of the track is becoming smaller.

In order to solve such a problem, a method is proposed to correct an offset value in one circumference of the track (for example, see JPN PAT APPLN KOKAI publication No. 2005-216378). According to this method, an offset value in one circumference of a track is corrected with the use of the absolute value and phase parameters of a runout amount relative to each track. A method of measuring the runout amount relative to any track comprises, for example, of measuring the runout amount with an actuator fixed to a track of a measuring target.

As a method of measuring a runout amount, another method is also proposed which comprises, with a head fixed to a given radial position from a rotation center on a disk medium, measuring a runout amount based on a time interval of a clock mark reproduction signal which is output from the head (for example, see JPN PAT APPLN KOKOKU Publication 3198490).

As set out above, it is possible to, at a manufacturing step for example, measure a runout amount relative to any given track in the disk drive with a disk medium incorporated therein and correct an offset value on one circumference of the track based on the runout amount. That is, it is possible to store a correction offset value (sometimes generally referred to as offset information) on one circumference of each track in a memory of the disk drive.

If any external impact (shock), etc., acts on a disk drive (a product) during or after its shipment, there sometimes arises a positional displacement (sometimes referred to as a disk shift) of a disk medium fixed to a spindle motor. Upon the occurrence of a disk shift, there occurs a variation in a disk runout amount and phase, and any correct offset value which was stored in the memory of the disk will become invalid. When, in such disk drive, the magnetic head is positioned on a target track on the disk medium, it becomes impossible to effect a moving adjustment of the magnetic head in one circumference of the track. In the disk drive of a high recording density level, therefore, a reproduction signal becomes lower in quality at a data read mode and, in the worst case, the reproduction of the recorded data becomes impossible.

BRIEF DESCRIPTION OF THE SEVERAL VIEWS OF THE DRAWINGS

A general architecture that implements the various feature of the invention will now be described with reference to the drawings. The drawings and the associated descriptions are provided to illustrate embodiments of the invention and not to limit the scope of the invention.

DETAILED DESCRIPTION

Various embodiments according to the invention will be described hereinafter with reference to the accompanying drawings. In general, according to one embodiment of the invention, there is provided a disk drive which has the function of updating already existing offset information by finding a variation of an offset value on one circumference of a track involved upon the occurrence of a disk shift.

[Structure of Disk Drive]

Figure 1:
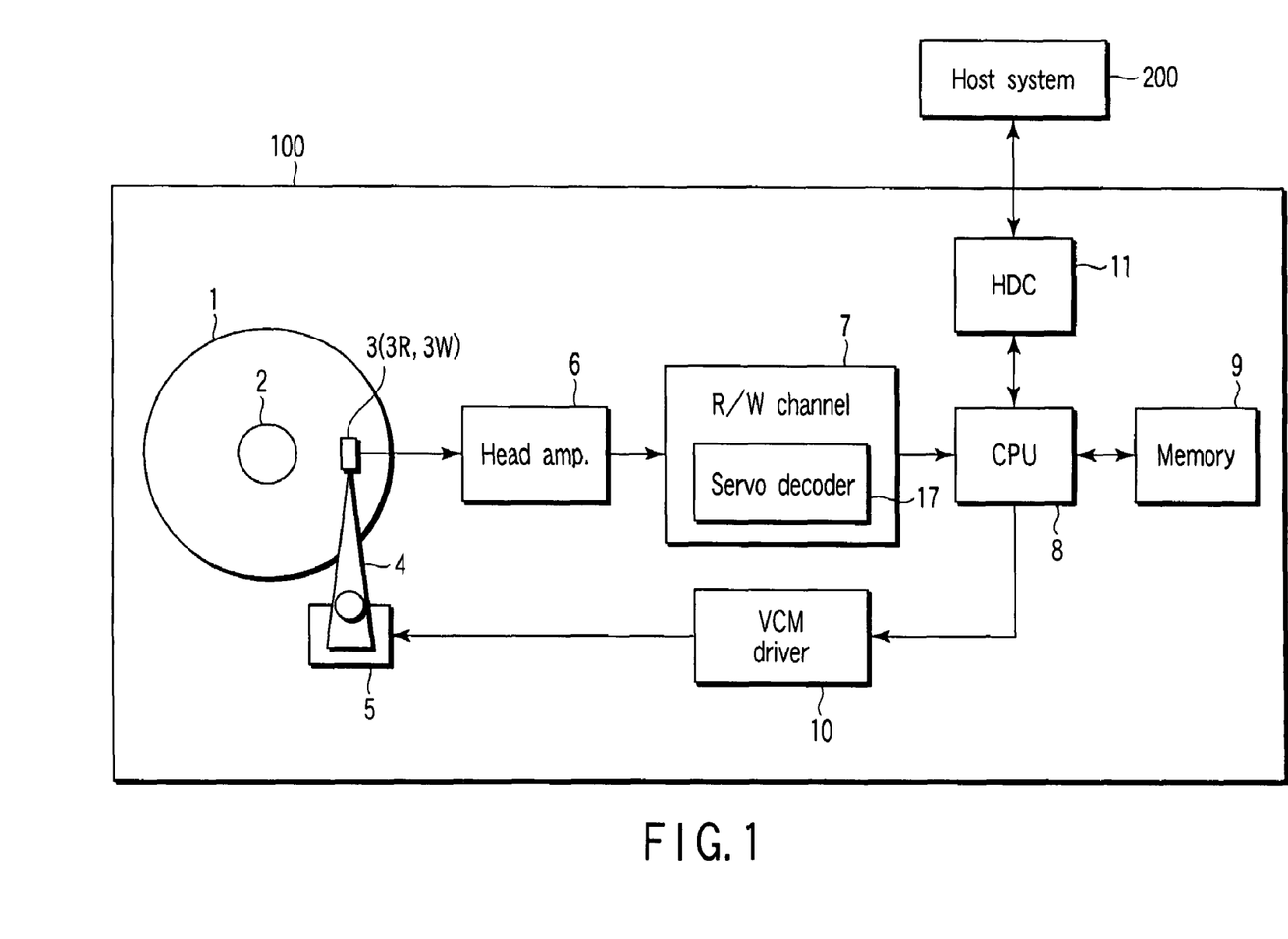
FIG. 1 is a block diagram showing a main section of a disk drive relating to an embodiment of the present invention.

According to an embodiment, FIG. 1 is a block diagram showing a main section of a disk drive relating to the present embodiment.

A disk drive 100 has, as shown in FIG. 1, a disk medium 1, a spindle motor (SPM) 2 for rotating the disk medium 1 and a rotary type (or a swing arm type) actuator 4 with a magnetic head 3 mounted on it.

The disk medium 1 is comprised of, for example, a magnetic recording medium for recording data by a magnetic recording system. The magnetic head 3 is of such a type as to have a structure with a read head 3R and write head 3W separately mounted on the same slider. The read head 3R is comprised of, for example, a GMR element and serves as a read only head for reproducing recorded data from the disk medium 1. The write head 3W is used to magnetically record data on the disk medium 1.

The actuator 4 is driven by a voice coil motor (VCM) 5 to allow it to swing over the disk medium 1 in a radial direction. The actuator 4 is comprised of a mechanism configured to, under control of a later-described CPU, position the magnetic head 3 at a target position (target track or target cylinder) on the disk medium 1.

The disk drive 100 comprises a head amplifier 6, a read/write (R/W) channel 7, a microprocessor (CPU) 8, a memory 9, a VCM driver 10 and a disk controller (HDC) 11. The head amplifier 6 amplifies a read signal which is output from the read head 3R.

The read/write channel 7 includes a signal processing circuit for processing the read signal which is output from the read head 3R and reproducing the recorded data. Further, the read/write channel 7 allows the write data which is output from the disk controller 11 to be encoded and a write signal which is supplied to the write head 3W to be output. The read/write channel 7 includes a servo decoder 17 which detects the servo data from a read signal which is output from the head amplifier 4. The servo data is, as will be described later, data for use in the positioning control of the magnetic head 3— see FIG. 2.

The microprocessor (CPU) 8 constitutes a main control unit of the desk drive 100 and performs head positioning control with the use of the servo data which is output from the servo decoder 17. Further, the CPU 8 controls data read/write operations under the cooperation of the disk controller 11. The disk controller 11 constitutes an interface between the disk drive 100 and the host system 200 and performs read/write data transfer control, etc.

The CPU 8 implements the head poisoning control by controlling the VCM driver 10 based on a position error between the position of the magnetic head 3 and the target position (access target track or cylinder). The VCM driver 10 contains a D/A converter for supplying a drive current to a VCM 5 under control of the CPU 8 (under an operation control amount). The VCM driver 10 controls the rotation drive of the actuator 4 under control of the CPU 8.

The memory 9 includes a flash EEPROM accessed by the CPU 8 and volatile memory such as a DRAM and SRAM. The flash EEPROM stores parameters for calculating an offset value relating to a target position (target track or target cylinder) as well as a default value of the disk runout amount and so on. The volatile memory stores, at any time, a disk runout amount and offset value calculated by the CPU 8. At a positioning time of the read/write head (3R, 3W), the CPU 8 performs a position correction with the use of the calculated offset value.

(Track Format)

Figure 2:
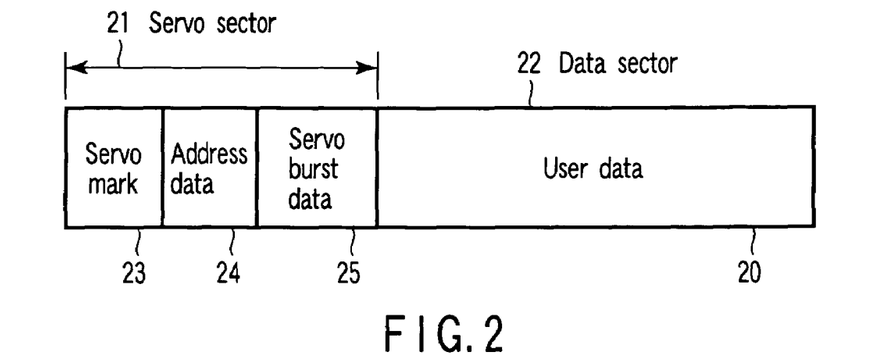
FIG. 2 is a view for explaining a track format relating to the present embodiment.
Figure 3:
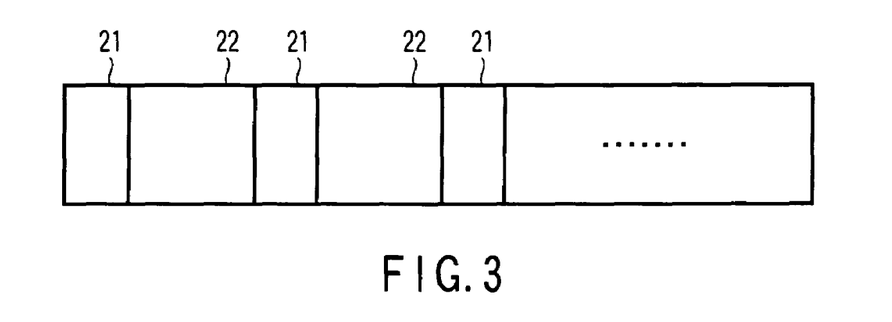
FIG. 3 is a view for explaining a track format relating to the present embodiment.

The disk medium 1 has a large number of concentric tracks each used as a data storage area. Each track (or cylinder) 20 has, as shown in FIG. 2, a servo sector 21 storing the servo data and data sector 22 storing the user data. In actuality, a track of one circumference on the disk medium 1 is such that, as shown in FIG. 3, a plurality of servo sectors 21 are arranged at predetermined intervals and that one or a plurality of sectors 22 are provided between the respective servo sectors.

The servo data includes, as shown in FIG. 2, a servo mark 23, address data 24, servo burst data 25, etc. The servo mark 23 is data which recognizes it as being a servo sector 21. The address data 24 is a code for detecting a track (cylinder) address and sector address. The servo burst data 25 is data for detecting a position error (an error relative to a track center) of the head 3. The CPU 8 decides the position of the magnetic head 3 over the disk medium 1 with the use of the servo data read out by the read head 3R.

[Head Positioning Control and Offset Information Updating]

Figure 5:
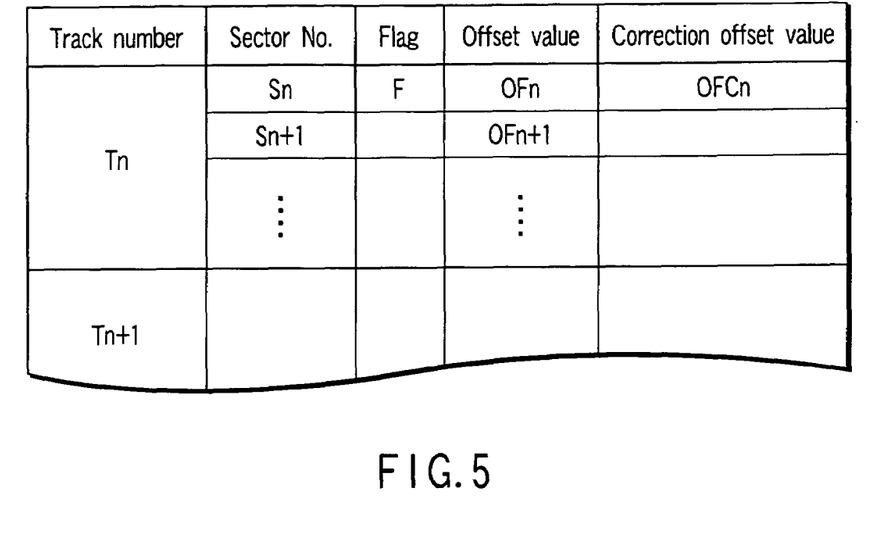
FIG. 5 is a view for explaining the contents of offset information relating to the present embodiment.

In the disk drive 100 of the present embodiment, at a time of a manufacturing process for example, a disk runout amount relative to any given track is measured after a disk medium 1 is incorporated, and offset information corresponding to one circumference of the track is calculated based on the disk runout amount and is stored in a flash EEPROM of a memory 9. This offset information is comprised of an offset value (OFn) corresponding to a respective sector address (sector number Sn) at each track (a track number Tn of address data) as shown in FIG. 5. The sector address (sector number Sn) is data for identifying the servo sector 21 in the track.

Figure 4:
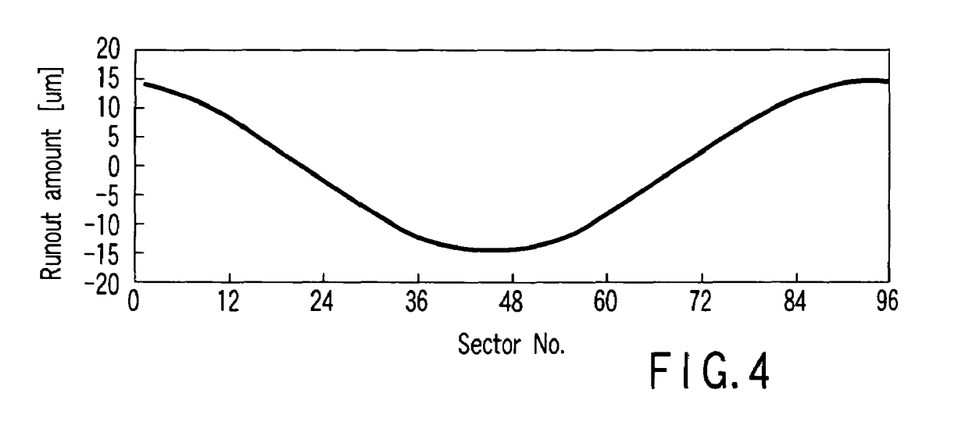
FIG. 4 is a view showing the characteristics of a disk runout amount relating to the present embodiment.

Here, as a general method for measuring the disk runout amount in any given track, an actuator 4 is physically fixed by pushing it against a stopper in the disk drive 100 and the servo data is read out by a read head 3R from the one circumference of the track. The disk runout amount and phase are then calculated from a variation amount of the servo data. By such measuring method, it is possible to measure the disk runout amount corresponding to one circumference of any given track, as shown in FIG. 4.

In the disk drive shipped as a product as set out above, the offset information corresponding to one circumference of the track is calculated based on the disk runout amount measured at a time of manufacturing and, as shown in FIG. 5, stored in the flash EEPROM of the memory 9. As set out above, if any external-shock, etc., acts on a disk drive shipped as a product, a disk shift occurs and the already measured disk runout amount and phase vary, so that the offset value (OFn) becomes ineffective.

According to the present embodiment, when any external shock acts on the disk drive 100, for example, during shipment as a product, the CPU 8 assumes it as generating a disk shift, directly measures a disk runout amount and phase shift amount corresponding to one circumference of the track and performs a correction operation on the offset information stored in the memory 9, as explained in more detail with reference to FIGS. 6 to 8.

Figure 6:
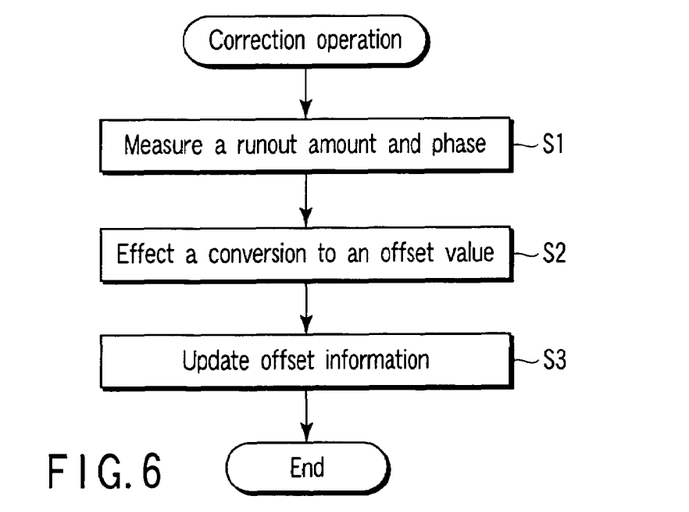
FIG. 6 is a flowchart for explaining a process of an offset information correction operation relating to the embodiment.

When a given external shock is detected, for example, by an acceleration sensor provided in the disk drive 100, the CPU 8 performs a correction operation for correcting the offset information (See a flowchart of FIG. 6). Here, if a normal data read/write operation is performed, the CPU 8 performs a correction operation after the read/write operation has been finished.

The CPU 8 measures a disk runout amount and phase shift amount corresponding to one circumference of the track, that is, the respective servo data, on any given track of the disk medium 1—step S1. Stated in more detail, the CPU 8 performs the reproduction of the servo data by the read head 3R before and after the measurement target track while off-tracking the magnetic head 3. The CPU 8 calculates the disk runout amount and phase by measuring a reproduction error generation amount corresponding to the servo sector.

Here, it is desirable to avoid any error measurement caused by noise at a time of measurement by performing an error correction at a proper correction intensity level.

Figure 7:
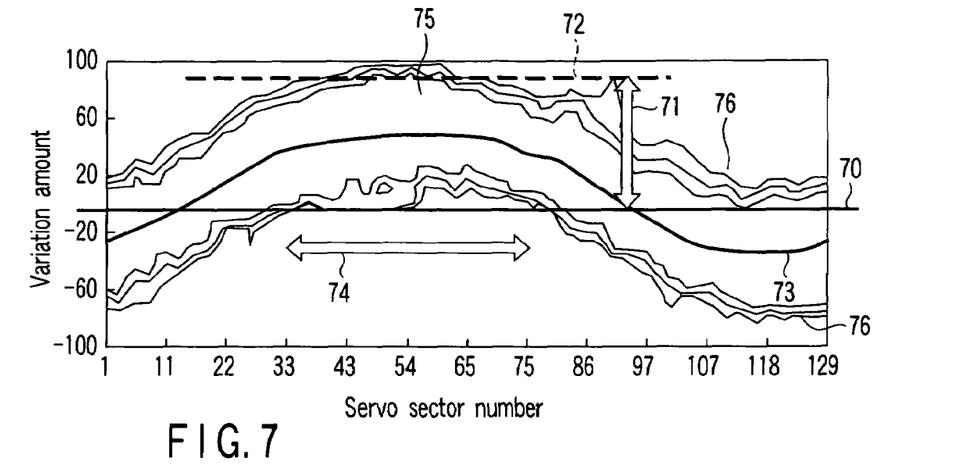
FIG. 7 is a view showing an error profile associated with a correction operation relating to the present embodiment.
Figure 8:
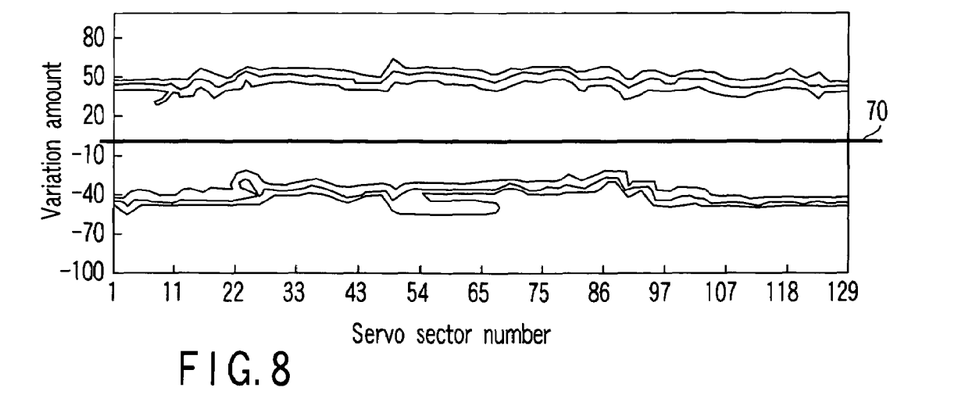
FIG. 8 is a view showing an error profile associated with a correction operation relating to the present embodiment.

FIGS. 7 and 8 are views showing an error profile relating to the measurement operation. FIG. 7 shows an error profile as a result of measurement and FIG. 8 shows an error profile after correction. In FIGS. 7 and 8, the abscissa shows a servo sector number and the ordinate shows a variation amount corresponding to a disk runout amount.

In FIG. 7, reference numeral 70 shows a reference level at a variation amount =zero and reference numeral 73 corresponds to a center line of a measurement target track. Here, attention should be given to an area 75 where, for example, the number of reproduction error occurrences is about 0 to 2. This area 75 corresponds to a track state range over which the disk runout occurs. The area 76 near to the area 75 corresponds to a neighboring area where the number of reproduction error occurrences is about 2 to 6. On the other hand, an outside 74 of the area 75 corresponds to, for example, "the number of reproduction occurrences" is about 6 to 8, and an outside track area where a reproduction error correction cannot be made.

In the result of measurement, the difference between a maximum level 72 and minimum level 70 on a resultant envelope means a variation amount caused by the disk runout. By specifying the peak position of the envelope it is possible to recognize the phase corresponding to the servo sector number.

The CPU 8 calculates a correction offset value (OFCn) by adding the measured variation amount and phase to the offset value (OFn) on the measurement target track — step S2. That is, the offset value of the respective servo sector is so corrected as to be positioned to a near center of the track width per sector. By the correction of the offset information, any local error generation due to the off-tracking is inhibited, to obtain a broader error generation margin. FIG. 8 shows a correction profile in the so-corrected case as set out above.

The CPU 8 updates the already existing offset information by storing in the memory 9 the correction offset value (OFCn), that is, a corrected offset value per servo sector, in step S3. The CPU 8 converts the variation amount and phase resulting from the disk runout to an offset value and stores in the memory 9 a correction offset value (OFCn), that is, a value obtained by correcting the existing offset value stored in the memory 9 on the basis of the offset value above—see FIG. 5.

The CPU 8 informs the occurrence of the disk shift and updating of the offset information to the host-system 200 through the disk controller 11. By doing so, the host system 200 can recognize the occurrence of an external impact, such as a shock, on the disk drive 100.

Where, on the drive disk of the present embodiment, an external force, such as a shock, acts, after it is shipped as a product, and a disk shift occurs on the disk medium 1 fixed on the spindle motor 2, the CPU 8 directly measures the disk runout amount and phase in track units and, based on the result of this measurement, performs update processing on the offset information for correcting the existing offset information. By doing so, the CPU 8 can, even if the existing record track varies due to the occurrence of the disk shift, make an accurate positioning adjustment on that record track with the use of the correction offset value.

Stated in more detail, as shown in FIG. 7, when the already existing record track varies due to a disk shift, for example, data corresponding to a servo sector number 54 is read out by the read head 3R, it follows that, for the existing offset information, the read head 3R is position-adjusted to an area indicated by the reference numeral 74. In this case, an uncorrectable read error is involved due to a shifting off the track area 75.

By the use of the updated correction offset information (correction offset value OFCn), on the other hand, the CPU 8 can position-adjust the read head 3R within a range of the track area 75. Thus, a read signal which is read out by the read head 3R is reproduced as a read error suppressed data. In other words, even where any disk shift subsequently occurs due to any external shock, it is possible to correctly read out recorded data.

Here, as shown in FIG. 5, the CPU 8 sets in the memory 9 a flag (F) representing the occurrence of a disk shift and, by doing so, can recognize the storing of the correction offset information properly corresponding to the disk shift. That is, by setting the correction offset value as a runout learned value at each sector address it is possible to adjust it against a variation of the disk runout amount. Since a disk shift may occur a plurality of times, an appropriate number of bits is desirably prepared so that any specific disk shift occurrence time can be recorded as a correction offset value.

In the present embodiment, the position adjustment using the correction offset information may be made at any of a data reproduction or write time.

According to the present invention, it is possible to correct the existing offset information according to a variation of a disk runout amount resulting from the occurrence of a disk shift and, by doing so, realize a highly accurate head positioning control at all times.

OTHER EMBODIMENTS

Although in the present embodiment the offset information has been explained as being stored in the flash EEPROM of the memory 9, the present invention is not restricted thereto and it may be recorded on a disk medium 1 at a specific area (system area).

Incidentally, there is sometimes the case where the offset information cannot be read out from on the disk medium 1 when a disk shift occurs. In any case, however, no problem occurs because updating is performed.

(Measuring Method of Disk Runout Amount and Phase)

The measuring method of the disk runout amount and phase may comprise dividing one circumference of a measurement target track into appropriate sectors and, while off-tracking a read head 3R, measuring a reproduction error generation amount, an error rate or a gain control value (AGC value) for adjusting an input signal for a read/write channel. The method comprises detecting a best point from a result of measurement and measuring a disk runout amount and phase from a maximal value and minimal value by joining each best point of these sectors.

Another measuring method may comprise, while off-tracking a read head 3R as set out above, predicting an error rate value with the use of parameters representing a signal quality as a statistical amount and obtaining a best point. This measuring method is already known (see T. Perkins and Z. A. Kerin, "A Window-Margin-Like Procedure for Evaluating PRML Channel Performance", IEEE Trans. Magn., Vol. 32, No. 2, pp 1109-1114 (1995), for example). This measuring method is generally utilized as the function included in the read/write channel in the field of a disk drive.

Further measuring methods may also be used which, from a result of measurement made on a variation of intervals of servo sectors, presumes the disk runout amount and phase. In general, if there is no disk runout, then all the sector intervals should be equal to each other. However, there exists a disk runout and, hence, a longer material and shorter interval portion occur. The disk runout amount can be calculated from a radius value which can be calculated from this time variation portion and track number.

In more detail, the CPU 8 detects a servo mark 23 included in respective servo sectors from a measurement target track and measures a time interval of a generating servo gate. The CPU 8 presumes a disk runout amount and phase based on the variation portion of the time interval of the servo gate as a result of the measurement.

This measurement method can be checked at any time in the case where the magnetic head 3 is on-tracked. It is, therefore, possible to, relative to a track on which recording is made under a present disk shift condition, periodically confirm the correction offset value and quickly detect a variation in the runout amount.

(Read Re-try Operation)

In disk drives in general, if a read error (reproduction error) occurs at a data read operation, the CPU 8 executes a re-try operation and re-executes a read operation on the same track. If the read error cannot be recovered by the re-try operation, the CPU 8 may perform the updating of the offset information in the present embodiment. By doing so, it is possible to suppress the read error caused by the generation of the disk shift. Here, if the CPU 8 applies correction offset information different from initially applied offset information during a re-try operation and, by doing so, obtains a coincidence with an offset value involved upon the recording of data on a read target track, then the CPU 8 allows a read operation. Immediately after the occurrence of a disk shift, the previously recorded tracks constitute a large proportion and, with a corresponding offset value first set as a default value, a correction offset value for a newly recording portion is used at a re-try operation time.

By doing so, newly recorded data tracks are sequentially increased and, when its ratio exceeds 50%, the CPU 8 can also replace the default value with a correction offset value. In this case, it is desirable to set a replacement unit against the default value, for example, per zone or per sub-zone. By thus applying a plurality of such correction offset values at the re-trying operation time, it is possible to handle such a situation even in the case where the recording time is made over a time range before and after the disk shift in one track.

(Track for Testing)

In the present embodiment, upon the occurrence of a disk shift, the measurement of the disk runout amount and phase is performed on any given track on the disk medium. In this case, the CPU 8 may set a specific track on the disk medium 1 as a testing track and perform the measurement of the disk runout amount and phase on the testing track. In actual use, the testing track is a specific track provided in a system area on the disk medium.

According to this method, for a respective measurement, a faster comparison is made with a result of a previous measurement and it is possible to achieve a high degree of accuracy. If the testing track is a specific track included in the system area, it is possible to avoid erasing of recorded data on an adjacent track to a measurement target track at a measuring time.

(Notice of Back-up)

In the present embodiment, the CPU 8 performs processing of a notice to the host system 200 relating to the occurrence of the disk shift and updating of the offset information. Here, if a disk shift occurs due to a shock, etc., to the disk drive 100, there is a possibility that such a disk shift exceeds an allowable value.

In such a case, if the disk drive is operated over a long period of time, this adds a further inconvenience. It is therefore desirable to provide a notice function to the disk drive 100 to the effect that a warning be given to the host system 200 against the occurrence of a disk shift and a prompt backup be taken on the user side.

While certain embodiments of the inventions have been described, these embodiments have been presented by way of example only, and are not intended to limit the scope of the inventions. Indeed, the novel methods and systems described herein may be embodied in a variety of other forms; furthermore, various omissions, substitutions and changes in the form of the methods and systems described herein may be made without departing from the spirit of the inventions. The accompanying claims and their equivalents are intended to cover such forms or modifications as would fall within the scope and spirit of the inventions.

What is claimed is:

1. A disk drive comprising:
   a magnetic head including a write head configured to write data on a disk medium and a read head configured to read out the data from the disk medium;
   an actuator configured to have the magnetic head mounted thereon;
   a memory unit configured to store offset information for, when the magnet head is positioned to a target position over the disk medium, adjusting an offset based on a positional relation between the write head and the read head;
   a controller configured to, at a data read/write operation time, drive the actuator under control with the use of the offset information stored in the memory unit and position the write head or read head to the target position over the disk medium;
   a measuring unit configured to measure a disk runout amount and phase of the disk medium at an operation time other than the data read/write operation;
   an offset information updating unit configured to generate correction offset information according to a result of measurement by the measuring unit and update the offset information of the memory means by the correction offset information;

a unit configured to decide whether or not a result of measurement made by the measurement unit is an abnormal value upon comparison with a reference value; and a unit configured to, when the result of comparison is an abnormal value, make a notice to that effect.

2. The disk drive according to claim 1, further comprising a detection unit configured to detect the occurrence of a disk shift on the disk medium, and wherein the measuring unit and the offset information updating unit are operated when the occurrence of the disk shift is detected by the detection unit.

3. A disk drive comprising:

a magnetic head including a write head configured to write data on a disk medium and a read head configured to read out the data from the disk medium;

an actuator configured to have the magnetic head mounted thereon;

a memory unit configured to store offset information for, when the magnet head is positioned to a target position over the disk medium, adjusting an offset based on a positional relation between the write head and the read head;

a controller configured to, at a data read/write operation time, drive the actuator under control with the use of the offset information stored in the memory unit and position the write head or read head to the target position over the disk medium;

a measuring unit configured to measure a disk runout amount and phase of the disk medium at an operation time other than the data read/write operation; and an offset information updating unit configured to generate correction offset information according to a result of measurement by the measuring unit and update the offset information of the memory means by the correction offset information, wherein the measuring unit measures the disk runout amount and phase based on a result of measuring the intervals of a plurality of servo sectors arranged on each track on the disk medium.

4. The disk drive according to claim 3, further comprising a detection unit configured to detect the occurrence of a disk shift on the disk medium, and wherein the measuring unit and the offset information updating unit are operated when the occurrence of the disk shift is detected by the detection unit.

5. A disk drive comprising:

a magnetic head including a write head configured to write data on a disk medium and a read head configured to read out the data from the disk medium;

an actuator configured to have the magnetic head mounted thereon;

a memory unit configured to store offset information for, when the magnet head is positioned to a target position over the disk medium, adjusting an offset based on a positional relation between the write head and the read head;

a controller configured to, at a data read/write operation time, drive the actuator under control with the use of the offset information stored in the memory unit and position the write head or read head to the target position over the disk medium;

a measuring unit configured to measure a disk runout amount and phase of the disk medium at an operation time other than the data read/write operation; and an offset information updating unit configured to generate correction offset information according to a result of measurement by the measuring unit and update the offset information of the memory means by the correction offset information, wherein the measuring unit and offset information updating unit are operated when the read error cannot be recovered by a re-trying operation which is done when a read error is generated at a time of a data read operation.

6. The disk drive according to claim 5, further comprising a detection unit configured to detect the occurrence of a disk shift on the disk medium, and wherein the measuring unit and the offset information updating unit are operated when the occurrence of the disk shift is detected by the detection unit.

7. A disk drive comprising:

a magnetic head including a write head configured to write data on a disk medium and a read head configured to read out the data from the disk medium;

an actuator configured to have the magnetic head mounted thereon;

a memory unit configured to store offset information for, when the magnet head is positioned to a target position over the disk medium, adjusting an offset based on a positional relation between the write head and the read head;

a controller configured to, at a data read/write operation time, drive the actuator under control with the use of the offset information stored in the memory unit and position the write head or read head to the target position over the disk medium;

a measuring unit configured to measure a disk runout amount and phase of the disk medium at an operation time other than the data read/write operation; and an offset information updating unit configured to generate correction offset information according to a result of measurement by the measuring unit and update the offset information of the memory means by the correction offset information, wherein at a time of a re-trying operation, the controller selectively uses correction offset information corresponding to a newly recorded sector, or offset information corresponding to a before-updating sector, at the read operation time.

8. The disk drive according to claim 7, further comprising a detection unit configured to detect the occurrence of a disk shift on the disk medium, and wherein the measuring unit and the offset information updating unit are operated when the occurrence of the disk shift is detected by the detection unit.

9. A head positioning control method for use in a disk drive comprising a magnetic head including a write head configured to write data on a magnetic medium and a read head configured to read out the data from the disk medium, an actuator having the magnetic head mounted thereon, and a memory unit configured to store offset information for, when the magnetic head is positioned to a target position over the disk medium, adjusting an offset which is set based on a positional relation between the write head and the read head, the method comprising:

measuring a disk runout amount and phase of the disk medium at a time of an operation other than a data read/write operation;

generating correction offset information according to a result of measurement by the measuring;

updating the offset information of the memory unit by the correction offset information;

determining whether or not a result of the measuring is an abnormal value upon comparison with a reference value; and making a notice to that effect, when the result of comparison is an abnormal value.

10. A head positioning control method for use in a disk drive comprising a magnetic head including a write head configured to write data on a magnetic medium and a read head configured to read out the data from the disk medium, an actuator having the magnetic head mounted thereon, and a memory unit configured to store offset information for, when the magnetic head is positioned to a target position over the disk medium, adjusting an offset which is set based on a positional relation between the write head and the read head, the method comprising:

measuring a disk runout amount and phase of the disk medium at a time of an operation other than a data read/write operation;

generating correction offset information according to a result of measurement by the measuring; and  updating the offset information of the memory unit by the correction offset information, wherein  the measuring measures the disk runout amount and phase based on a result of measuring the intervals of a plurality of servo sectors arranged on each track on the disk medium.

11. A head positioning control method for use in a disk drive comprising a magnetic head including a write head configured to write data on a magnetic medium and a read head configured to read out the data from the disk medium, an actuator having the magnetic head mounted thereon, and a memory unit configured to store offset information for, when the magnetic head is positioned to a target position over the disk medium, adjusting an offset which is set based on a positional relation between the write head and the read head, the method comprising:

measuring a disk runout amount and phase of the disk medium at a time of an operation other than a data read/write operation;

generating correction offset information according to a result of measurement by the measuring; and  updating the offset information of the memory unit by the correction offset information, wherein  the measuring and the updating are performed when the read error cannot be recovered by a re-trying operation which is done when a read error is generated at a time of a data read operation.

* * * * *